Jan. 15, 1952        E. H. MEIER        2,582,714
AUTOMATIC VOLUME CONTROL TIME RESPONSE SWITCHING
Filed Aug. 13, 1949        2 SHEETS—SHEET 2
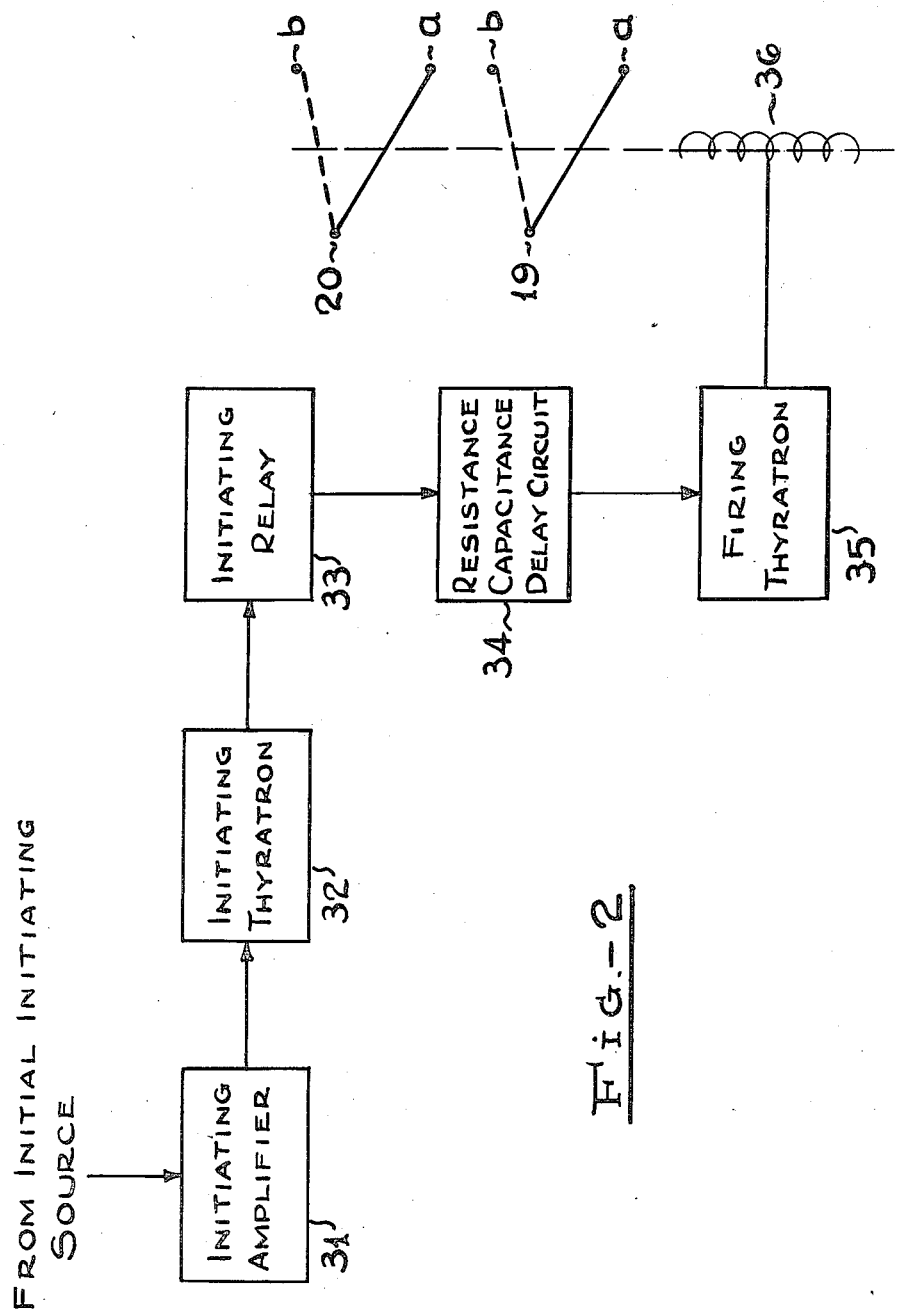
Edwin H. Meier Inventor
By W. V. Heilman Attorney Patented Jan. 15, 1952

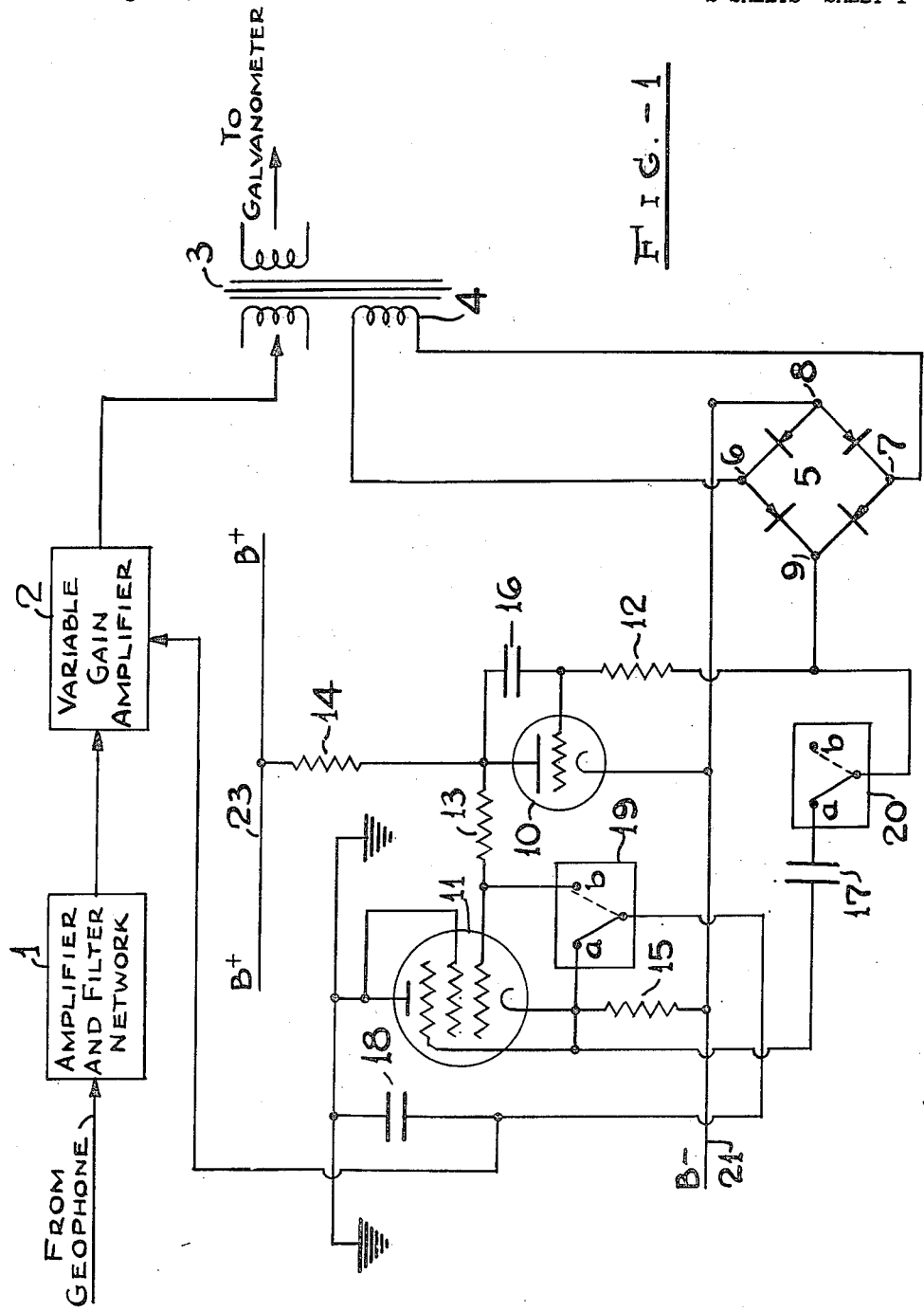

2,582,714

UNITED STATES PATENT OFFICE 2,582,714

AUTOMATIC VOLUME CONTROL TIME RESPONSE SWITCHING

Edwin H. Meier, Tulsa, Okla., assignor to Standard Oil Development Company, a corporation of Delaware Application August 13, 1949, Serial No. 110,189

7 Claims. (Cl. 179—171)

The present invention relates to an improved apparatus and method for obtaining seismograph records in seismic prospecting. More particularly the invention relates to the obtaining of seismograph records in which the recorded traces are of the same order of magnitude throughout the record.

One well-known technique of exploration for oil or other mineral deposits comprises seismic prospecting or reflection seismography wherein a hole is drilled into the earth and an explosive shot or other means of producing sound is placed in the hole. The sound source is actuated and the sound waves traveling through the earth are detected at various points on the surface of the earth by means of sensitive pick-ups or geophones which translate the detected sound waves into electrical impulses which after suitable amplification can be recorded on a seismograph. Conventionally, a seismograph record is obtained by means of a number of moving coil galvanometers each one of which has a mirror attached thereto, the galvanometers being arranged in a battery in connection with a source of light in such relation to a moving strip of sensitized paper or film that there will be recorded on the paper or film a plurality of wave forms or traces representative of the sound waves which have been picked up by the individual geophones, suitably amplified, and fed to the galvanometers. Many seismograph instruments are capable of recording as many as 24 or 36 individual traces simultaneously. The strip of paper or film is moved longitudinally at a substantially constant speed and is provided with suitable timing marks so that when the seismograph record or seismogram is later examined it is possible to determine the length of time required for the arrival of sound waves at any particular point on the earth's surface either directly from the sound source or by reflection from underlying strata.

During the making of a seismograph record the "first kick," i. e., the first arrival of the disturbance from the shot, will generally reach the geophones placed near the shot point within a few hundredths of a second after the shot has been detonated and the ground disturbance will continue for from about one to four seconds until it decreases to the level of normal ground unrest. The amplitude of the "first kick" signal, which represents the upper level of wave energy force that it is desired to detect may differ from the amplitude of normal ground unrest, representing the lower level of wave energy to be detected, by a ratio of as much as a million to one. It is thus evident that in order that the traces on the seismograph record may be of usable size, the amplifier circuit associated with each geophone and its corresponding galvanometer must have an amplitude control arrangement capable of holding the output reasonably constant over the above mentioned range of input signals.

One suitable method of producing the desired range of amplitude control in a seismograph amplifier circuit is to provide for one or more stages of fixed gain amplification and filtering together with an amplification stage having variable gain in conjunction with an automatic volume control loop. The present invention is concerned with the provision of better automatic volume control in connection with such amplification.

Since the first impulse (commonly referred to as the "first kick") received by the geophones after shooting during seismic prospecting is of fairly large amplitude it is desirable to provide for reducing the gain of the amplifier rapidly at this time for increasing signals in order to get the recorded trace under control within a few hundredths of a second after the first impulse is received. However, since later impulses representing reflected waves will be of smaller amplitude than the "first kick" it is desirable to provide for changing the characteristics of the automatic volume control so that after the "first kick" the circuit will have moderately fast time response to decreasing signals and moderately slow response for increasing signals so that the gain will not be reduced too rapidly when reflected impulses are received, thus permitting the reflected impulses to persist without being distorted by changes in gain during reception of the reflected impulses.

It is an object of the present invention to provide for improved automatic amplitude control in an amplifier circuit used in seismic recording. It is another object of the invention to provide for switching of the time response characteristics of the amplifier circuit so that the amplitude of the seismograph trace can be brought under control rapidly and then maintained at a relatively constant level for the rest of the trace without reducing the amplitude of reflection signals that will be superimposed on the general signal level. A more specific object of the invention is to provide an automatic volume control circuit in a variable gain amplifier for a seismograph which will contain means for time response switching during seismic recording, furnishing fast response time for gain control initially followed, after receipt of the first impulse, by moderately fast response time for gain control of a decreasing signal level and moderately slow response time for gain control of increasing signal levels.

The nature and objects of the invention will be more readily understood from the ensuing description and from the drawing, in which Fig. 1 presents a schematic diagram of an amplifier circuit employing the automatic volume control arrangement of the present invention; and Fig. 2 depicts a block diagram of the circuit employed to actuate the time response switching in the circuit of Fig. 1.

With particular reference to Fig. 1, a seismic signal such as one received from a geophone is fed into a fixed amplifier and filter network 1 and thence into a variable gain amplifier 2. The output from amplifier 2 is fed to transformer 3 and thence to the recording galvanometer of the seismograph.

Fixed amplifier and filter network 1 may be of any suitable design, its function being to amplify the signal to a level suitable for recording on a seismograph and for filtering out spurious signals which do not contribute to interpretation of the record. A suitable amplifier filter network will be one providing for amplification factors of say 100 to 3000 and which is adapted to filter out signals whose frequencies are outside of those desired for the record. Thus "ground roll," having frequencies below about 15 cycles per second, and wind noise, having frequencies of 100 cycles per second or higher, would be excluded.

Variable gain amplifier 2 can be of any design providing for automatic control of gain as a function of signal level. For example, it may comprise an amplifier stage in conjunction with an attenuator stage wherein the latter is adapted to reduce the amplitude of signals fed into it in proportion to a control voltage applied thereto. One suitable design of attenuator comprises a voltage divider consisting of a fixed resistance and an electronic circuit comprising two vacuum tubes whose plates are connected to each other, a grid of one of the vacuum tubes being tied to the cathode of the second tube and to the fixed resistance and the cathode of the first vacuum tube being connected to a grid of the second vacuum tube and to the common ground of the circuit. Attenuation is controlled by the amount of negative potential applied to an electrode in the circuit other than a cathode and other than the electrode connected to a cathode. This type attenuator circuit is described and claimed in copending application Ser. No. 98,506 of Edwin H. Meier, filed June 11, 1949.

Referring further to Fig. 1, by means of a third winding 4 on transformer 3 part of the output signal is sampled and fed to input terminals 6 and 7 of full wave bridge rectifier 5. The output of rectifier 5 is adapted to be fed by means of relay-operated switches 19 and 20 through either of two filter-amplifier arrangements. When each of these switches is in the "a" position, which is the position of the switches until after the "first kick" is received from the seismic pickup, the filter arrangement is such that the gain of amplifier 2 is reduced rapidly when the signal suddenly appears, but for decreasing signal levels gain control is subjected to a long time delay.

After the "first kick" has been received switches 19 and 20 are thrown to the "b" position by means of relays as described more fully later in connection with Fig. 2. With the switches in the "b" position the time response for gain control is moderately fast for decreasing signal level and moderately slow for gain control of increasing signal level.

Thus it may be stated that the invention comprises an improved automatic volume control circuit for the variable gain amplifier stage of an amplifier circuit in which the automatic volume control circuit comprises a first time response network characterized by having a first time delay for bringing the gain of the variable gain amplifier stage under control when a signal of increasing amplitude is received by the amplifier stage and a second time delay for controlling the gain for signals of decreasing amplitude and a second time response network characterized by having a third time delay for bringing the gain under control when a signal of increasing amplitude is received and a fourth time delay for gain control for signals of decreasing amplitude, together with means for switching from the first time response network to the second time response network after an initial impulse is received by the amplifier circuit. The first time delay is short, the second one is long, and the third one moderately long and the fourth one moderately short. In other words, the fourth time delay is longer than the first, the third time delay is longer than the fourth and the second is longer than the third. Furthermore the longest time delay, i. e., the second, is of the order of magnitude of 50 to 100 times that of the first.

In general, in the first time response network, i. e., that which is operative when switches 19 and 20 are in the "a" or "first kick" position, the first gain control time delay (for increasing signal level) should be in the range of about 0.01 to 0.03 second (preferably about 0.02 second) and the second time delay (for decreasing signal level) should be in the range of about 0.5 to 2 seconds (preferably about 1 second). In the second time response network, operable when switches 19 and 20 are in the "b" or reflection position, the third time delay (for increasing signal level) should generally lie in the range of about 0.3 to 0.7 second (preferably about 0.5 second) and the fourth time delay (for decreasing signal level) in the range of about 0.05 to 0.2 second (preferably about 0.1 second).

Time response as the term is used here is defined as the time required for the output voltage to return essentially to its previous level after the input voltage has been increased or decreased instantaneously by a factor of 10.

In the example of a suitable arrangement for effecting gain control time delay as depicted in Fig. 1 negative output terminal 9 of rectifier 5 is connected through resistor 12 to the grid of D. C. amplifier tube 10 and to condenser 16. Output terminal 9 is also connected to the arm of switch 20. The plate of amplifier tube 10 is connected to condenser 16 and through resistor 13 to the control grid of cathode follower tube 11. There is also a connection from the plate of tube 10 through resistor 14 to the positive bus 23 of the source of B voltage for the circuit. Positive terminal 8 of rectifier 5 is connected to the negative bus 21 of the source of B voltage as are the cathodes of tubes 10 and 11, the latter connection being through resistor 15. The cathode and suppressor grid of tube 11 are connected through condenser 17 to switch point "a" of switch 20. Switch point "b" of switch 20 makes an open circuit. The screen grid and plate of tube 11 are tied to the common ground of the circuit. Condenser 18 is tied from the control point in variable gain amplifier stage 2 to the common ground. Tube 11 is hooked up as a triode and obviously could be replaced by a triode tube. When switch 19 is in position "a" the control point of amplifier 2 is connected to the cathode and suppressor grid of tube 11 and also to condenser 17. When switch 19 is in position "b" the control point is connected to the plate of tube 10 through resistor 13. Switches 19 and 20 may be so connected that they will be operated simultaneously or they may constitute elements of a single switch with the proper contact points.

It is to be understood that the various electrical components of the automatic volume control circuit depicted in Fig. 1 may have values selected over a fairly wide range. As a specific example of an operable combination, tube 10 may be a 6AQ6 triode, tube 11 a 9001 pentode, resistors 14 and 15 may have values of 5 megohms, resistor 12 of 0.5 megohm and resistor 13 of 0.3 megohm. Condensers 16, 17 and 18 would have capacities of 0.001, 0.1 and 1 microfarad, respectively. B voltage busses 21 and 23 may suitably be −180 volts and +180 volts when the above components are used.

Resistor 12 and condenser 16 serve as a filter for the rectified voltage received from rectifier 5 and impressed on the grid of amplifier tube 10. In general, the characteristics of this filter should be such that it will pass essentially all frequencies below about 15 cycles per second and will cut out practically all ripples above about 25 to 30 cycles per second. Such characteristics can be obtained by selecting resistor and condenser values such that the mathematical product of the amplification factor of tube 10, the resistance in ohms of resistor 12 and the capacitance in farads of condenser 16 lies in the range of about 0.01 to 0.05. Thus if tube 10 has an amplification factor of 50, resistor 12 a resistance of 0.5 megohm and condenser 16 a capacitance of 0.001 microfarad, the product will be 0.025.

In order that the automatic volume control circuit will have the proper time response characteristics it is desirable that the various other resistances and capacitances in the circuit have the following mathematical relationships, resistances being expressed in ohms and capacitances in farads:

(1) For the "first kick" position of the circuit, i. e., when switches 19 and 20 are in the "a" position, the product of the capacitance of condenser 18 (the condenser tying the control point of amplifier stage 2 to ground) and the plate resistance of cathode follower tube 11 should lie in the range of about 0.01 to 0.05, and the product of the capacitance of condenser 18 and the resistance of cathode resistor 15 should be at least 1.

(2) For the "reflection" position of the circuit, i. e., when switches 19 and 20 are in the "b" position, the product of the capacitance of condenser 18 and the sum of the resistance of resistor 13 and 14 should be at least 1 and the product of the capacitance of condenser 18 and the sum of the resistance of resistor 13 and the plate resistance of the amplifier tube 10 should be in the range of about 0.1 to 0.5. The actual values will of course depend on the requirement of the particular circuit used.

The function of condenser 17 is to stabilize the circuit to keep the gain control from "overshooting" when the first impulse is received. It will be seen that this condenser is cut out of the circuit when the switches 19 and 20 are thrown to the "b" position. Condenser 17 may have a capacitance value of the range of about 0.02 to 0.5 microfarad, depending on the needs of the specific circuit.

Referring again to Fig. 1 it will be seen that with switches 19 and 20 in the "a" position the rectified voltage obtained from rectifier 5 is filtered to some extent and is used to furnish a voltage on the grid of tube 10 which is negative with respect to the potential on the cathode of that tube. The voltage on the plate of tube 10 is impressed on the control grid of tube 11 and thus determines the voltage applied to the control point of variable gain amplifier stage 2. When a sudden increase in signal level occurs in the amplifier output the voltage impressed on the grid of tube 10 suddenly increases and tube 10 is cut off, causing a positive signal to appear suddenly on the control grid of tube 11. The low impedance output of the cathode of tube 11 rapidly changes the charge on condenser 18 and thus gives a fast time response to the control voltage applied to amplifier stage 2. When the output signal level is decreasing the time response is determined by cathode resistor 15 and condenser 18 and is relatively long.

After switches 19 and 20 have been thrown to position "b" after arrival of the first impulse from the seismic pickup, as described in conjunction with Fig. 2, it will be seen that the plate of tube 10 is connected to the control point of amplifier stage 2 through resistor 13. When an increased output signal level occurs which is reflected as an increased potential on the grid of tube 10, tube 10 is cut off and condenser 18 is charged moderately slowly toward the plus potetial of bus 23 through resistors 13 and 14, giving an intermediate time response to the control voltage applied to amplifier stage 2. When a decrease in output signal level occurs, current flows through tube 10 and condenser 18 is charged toward the negative potential of bus 21 through resistor 13 at a moderately fast rate, giving a relatively short time response to the control voltage applied to stage 2.

The manner in which switches 19 and 20 are thrown from position "a" to position "b" is shown in Fig. 2. The initial impulse received from a seismic pickup placed near the origin of the seismic shot is fed into amplifier 31. The amplified impulse is fed into the grid of a thyratron 32 which in turn operates an initiating relay 33. The latter relay may be adapted to change the potential on delay circuit 34 comprising a resistance-capacitance network to delay the build-up of a potential on thyratron 35. When a sufficient charge has been built up to fire thyratron 35, relay 36 is actuated to throw switches 19 and 20 simultaneously. By a suitable choice of resistance-capacitance values in circuit 34 the actuation of switches 19 and 20 can be effected at any desired time after receipt of the initial impulse in initiating amplifier 31.

Alternatively switches 19 and 20 could be hand controlled or could be actuated by a delay relay by well known means.

The invention is not limited to the specific examples presented, as numerous modifications thereof can be made by those skilled in this particular art. The invention is to be limited only by the following claims.

What is claimed is:

1. In an amplifier circuit for seismic signals received from a seismic pickup and fed to a seismograph, said circuit including a variable gain amplifier stage wherein gain is controlled by a voltage impressed on a control point therein, an improved automatic volume control circuit for said stage comprising means for sampling the signal output voltage from said variable gain amplifier stage, means for rectifying the sampled output voltage, means for amplifying the rectified voltage, a first time response means adapted to feed said rectified voltage onto said control point, adapted to impose a first short time delay in transmitting to said control point voltage changes representative of increased signal level and adapted to impose a second long time delay in transmitting to said control point voltage changes representative of decreased signal level, a second time response means adapted to feed said rectified voltage onto said control means, adapted to impose a third moderately long time delay in transmitting to said control point voltage changes representative of increased signal level and adapted to impose a fourth moderately short time delay in transmitting to said control point voltage changes representative of decreased signal level, said fourth moderately short time delay being longer than said first short time delay, said third moderately long time delay being longer than said fourth moderately short time delay and said second long time delay being longer than said third moderately long time delay, switching means having a first position in which connection is established between said first time response means, said rectified voltage amplifying means and said control point and having a second position in which connection is established between said second time response means, said last named amplifying means and said control point and means adapted to move said switching means from its first position to its second position after a predetermined interval following receipt of an initial impulse from said seismic pickup.

2. Improved circuit according to claim 1 in which said second time delay has a duration of from 50 to 100 times said first time delay.

3. Automatic volume control circuit according to claim 1 in which in said first time response means said first short time delay is from about 0.01 to about 0.03 second and said second long time delay is from about 0.5 to about 2 seconds and in which in said second time response means said third moderately long time delay is from about 0.3 to about 0.7 second and said fourth moderately short time delay is from about 0.05 to about 0.2 second.

4. In an amplifier circuit for seismic signals received from a seismic pickup and fed to a seismograph through an output transformer, said amplifier circuit including a variable gain amplifier stage wherein gain is controlled by a voltage impressed on a control point therein, an improved automatic volume control circuit comprising a sampling winding on said output transformer for sampling the output signal voltage from said variable gain amplifier stage, a full wave bridge rectifier, means connecting the input of said rectifier with said sampling winding, a D. C. amplifier tube, a cathode follower tube, means connecting the output of said rectifier through a filter to the grid of said D. C. amplifier tube, means connecting the plate of said D. C. amplifier tube with the control grid of said cathode follower tube, switching means having a first contact position and a second contact position, said switching means being adapted when in said first contact position to connect the cathode of said cathode follower tube to the control point of said variable gain amplifier stage and when in said second position to connect the plate of said D. C. amplifier tube through a resistor to the control point of said variable gain amplifier stage, means adapted to move said switching means from its first contact position to its second contact position after a predetermined interval following receipt of a first impulse from said seismic pickup, and means connecting said control point of said variable gain amplifier stage to the common ground of said circuit through a condenser.

5. Circuit according to claim 4 in which said filter is adapted to pass essentially all frequencies below about 15 cycles per second and to cut out essentially all ripples above about 25 to 30 cycles per second, and in which the capacitance in farads of said condenser connecting said variable gain control point with the common ground of the circuit bears such mathematical relationship with the various resistances in the circuit in ohms that the product of said capacitance and the resistance of the plate of the cathode follower tube lies in the range of about 0.01 to 0.05, the product of said capacitance and the resistance of the cathode resistor of the cathode follower tube is at least 1, the product of said capacitance and the sum of the resistance of the plate resistor of the D. C. amplifier tube and the resistance of the resistor connecting the plate of the D. C. amplifier tube with the variable gain stage control point is at least 1, and the product of said capacitance and the sum of the resistance of said last named resistor and the resistance of the plate of said D. C. amplifier tube lies in the range of about 0.1 to 0.5.

6. In an amplifier circuit for seismic signals received from a seismic pickup and fed to a seismograph through an output transformer, said amplifier circuit including a variable gain amplifier stage wherein gain is controlled by a voltage impressed on a control point therein, an improved automatic volume control circuit comprising a sampling winding on said output transformer for sampling the output signal voltage from said variable gain amplifier stage, a full wave bridge rectifier, means connecting said sampling winding with the input of said rectifier, a first vacuum tube, a first resistor connecting the control grid of said first vacuum tube with the negative output terminal of said rectifier, a first condenser connecting the control grid of said first vacuum tube with the plate of said first vacuum tube, a second vacuum tube, a second resistor connecting the plate of said first vacuum tube with the control grid of said second vacuum tube, a source of B potential, means connecting the cathode of said first vacuum tube with the negative side of said source of B potential, a third resistor connecting the plate of said first vacuum tube with the positive side of said source of B potential, a fourth resistor connecting the cathode of said second vacuum tube with the negative side of said source of B potential, means connecting the positive side of said rectifier with the negative side of said source of B potential, a second condenser connecting the control point of said fixed gain amplifier stage with the common ground of the circuit, means connecting the plate of said second vacuum tube with the common ground of the circuit, a third condenser connected to the cathode of the second vacuum tube, a first switching means having a first position and a second position and adapted in its first position to connect the cathode of said second vacuum tube with the negative terminal of said rectifier through said third condenser and in its second position to open said connection, a second switching means having a first position and a second position and adapted to its first position to connect the cathode of said second tube with the control point of said variable gain amplifier stage and in its second position to connect the plate of said first vacuum tube through said second resistor with the control point of said variable gain amplifier stage, and means adapted to throw said first and second switching means from their first position to their second position after a predetermined interval following receipt of a first impulse from said seismic pickup.

7. Improved circuit according to claim 6 in which the resistance values in ohms of the resistors and the capacitance values in farads of the condensers employed therein are determined by mathematical relationships wherein the product of the amplification factor of the first vacuum tube, the resistance of the first resistor and the capacitance of the first condenser lies in the range of 0.01 to 0.05, the product of the capacitance of the second condenser and the resistance of the plate of the second vacuum tube lies in the range of 0.01 to 0.05, the product of the capacitance of the second condenser and the resistance of the fourth resistor is at least 1, the product of the capacitance of the second condenser and the sum of the resistances of the second and third resistors is at least 1 and the product of the capacitance of the second condenser and the sum of the resistances of the second resistor and the plate of the first vacuum tube lies in the range of 0.1 to 0.5.

EDWIN H. MEIER.

REFERENCES CITED

The following references are of record in the file of this patent:

UNITED STATES PATENTS

| Number | Name | Date |
| --- | --- | --- |
| 2,489,126 | Fay et al. | Nov. 22, 1949 |